Patented Jan. 3, 1928.

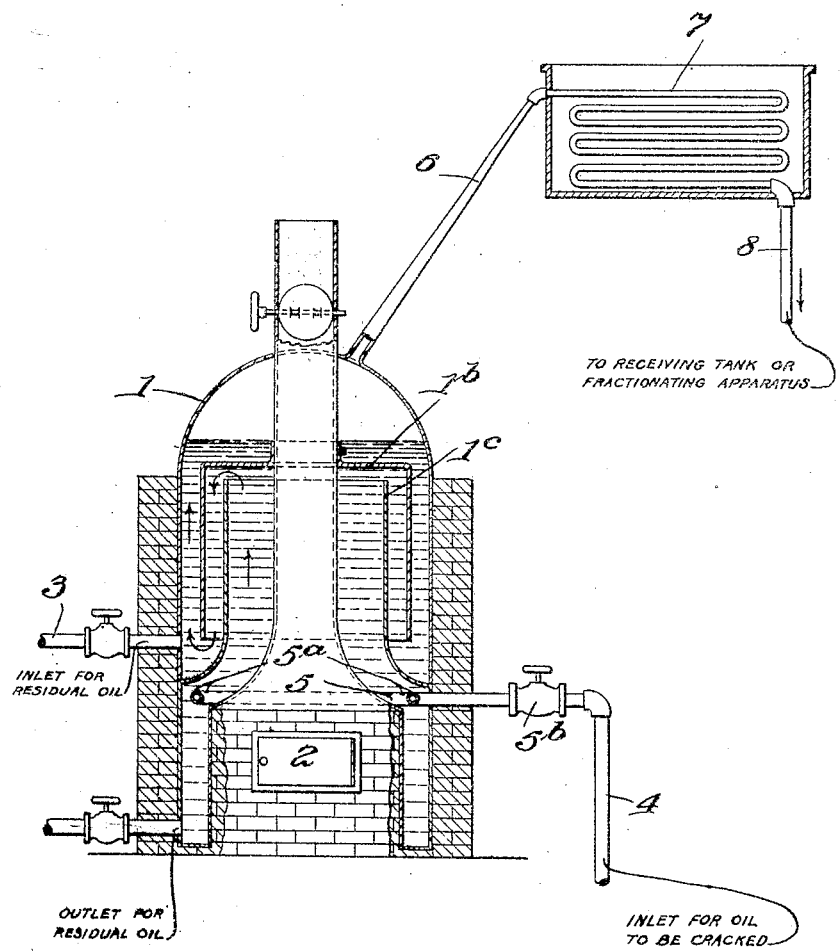

1,655,030

UNITED STATES PATENT OFFICE.

FRANK C. VANDE WATER AND FREDERICK R. SUNDERMAN, OF NEWBURGH, NEW YORK, ASSIGNORS TO PETROLEUM LABORATORIES INC., OF NEWBURGH, NEW YORK, A CORPORATION OF NEW YORK.

OIL-CRACKING APPARATUS.

Application filed August 29, 1922. Serial No. 585,114.

Our present invention relates to improvements in apparatus for treating petroleum products and more particularly to an improved cracking apparatus for the manufacture of low boiling point products of petroleum.

The invention aims to provide an extremely simple apparatus which will be continuous in action, and is capable of being operated without the necessity of any material pressure.

The invention further aims to provide an apparatus by which the surplus or excess carbon will be held in solution or suspension and prevented from depositing on the walls of the apparatus, and may be readily removed from time to time without in any way interrupting or affecting the apparatus.

With these and other objects in view, the invention includes the novel apparatus hereinafter described and particularly defined by the appended claims, the invention being explained by the aid of the accompanying drawing illustrating diagrammatically an apparatus suitable for carrying out the process.

Referring by reference characters to this drawing, the numeral 1 designates a still of suitable capacity designed to be heated by a furnace 2 and having supply means 3 for introducing thereinto what we term residual oil, or a petroleum oil of either base, which has a boiling point higher than the boiling point of the oil to be treated.

The still having been supplied with a suitable quantity of oil having a boiling point above 500° F., heat is applied, and if the boiling point is not high enough, the contents are boiled down until the temperature of the oil is approximately 750° F., as determined by the thermometer with which such still are usually provided.

The oil to be treated is then supplied under requisite pressure from a suitable source, as by means of a pump (not shown) through pipe 4 into coil 5 which is located in the bottom of the still and which is provided with a plurality of openings $5^a$ through which the oil issues into the body of residual oil in a finely divided condition.

The flow of the oil is regulated in a suitable manner as by valve $5^b$, (or by regulating the speed of the pump), care being taken to so adjust or proportion the feed that the incoming oil will not unduly reduce the temperature of the residual oil, which must be kept at a substantially even or uniform cracking temperature.

The oil to be treated or cracked passes up into and through the residual oil, no pressure being employed save that due to the weight of the residual oil which is of higher specific gravity than the oil to be cracked, and which is practically atmospheric pressure and hence negligible. The incoming oil is immediately vaporized by the highly heated residual oil and the hydrocarbon molecules decomposed or cracked, and the resulting vapors pass by way of pipes 6 to condenser 7 and thence through pipe 8 to any suitable reservoir (not shown) in the shape of cracked oil.

Preferably we employ a still which will cause a circuitous passage of the oil being vaporized, such as shown in the drawings by a bell or inverted dome member $1^b$ overlapping a lower annular partition member $1^c$, these being in effect baffles, and the course of the oil being vaporized being indicated by the arrows. Thereby we subject the oil to be cracked for a longer period to the heat of the cracking oil, or in other words, cause it to take a longer period in passing through the cracking oil.

The period of contact may be varied by raising or lowering the baffle member $1^b$ by suitable adjusting means, as shown, or in any other suitable manner.

Having thus described our invention, what we claim is:—

1. In combination, a still body adapted to contain a menstruum oil, a flue for combustion gases passing upwardly through the same, a baffle projecting inwardly from said still body and upwardly substantially midway between the walls of said flue and the walls of said still body.

2. In combination, a still body adapted to contain a menstruum oil, a flue for combustion gases passing upwardly through the same, a baffle projecting inwardly from said still body and upwardly substantially midway between the walls of said flue and the walls of said still body, and a canopy attached to said flue extending downwardly between said baffle and the walls of the still body.

3. In combination, a still body adapted to contain a menstruum oil, a flue for combustion gases passing upwardly through the same, a baffle projecting inwardly from said still body and upwardly substantially midway between the walls of said flue and the walls of said still body, and a canopy adjustably attached to said flue extending downwardly between said baffle, and the walls of said still body and terminating short of the juncture of the baffle with the still body.

4. A still body, means for supplying oil in a number of fine streams adjacent the lower portion of said still, a baffle directing the supplied oil upwardly, an inverted bell shape baffle outside and above the first baffle, and means for leading off the vapors formed.

5. A still body, means for supplying oil in a number of fine streams adjacent the lower portion of said still, a baffle directing the supplied oil upwardly, an inverted bell shape baffle adjustable in height outside and above the first baffle, and means for leading off the vapors formed.

FRANK C. VANDE WATER.
FREDERICK R. SUNDERMAN.